(12) United States Patent
Rudiak

(10) Patent No.: US 7,205,751 B2
(45) Date of Patent: Apr. 17, 2007

(54) ENABLE AND DISABLE OF DIODE EMULATION IN A DC/DC CONVERTER

(75) Inventor: Jerry A. Rudiak, Wake Forest, NC (US)

(73) Assignee: Intersil America's Inc., Milpitas, CA (US)

( * ) Notice: Subject to any disclaimer, the term of this patent is extended or adjusted under 35 U.S.C. 154(b) by 366 days.

(21) Appl. No.: 10/854,358

(22) Filed: May 26, 2004

(65) Prior Publication Data

US 2005/0200342 A1 Sep. 15, 2005

Related U.S. Application Data

(60) Provisional application No. 60/568,359, filed on May 5, 2004, provisional application No. 60/552,551, filed on Mar. 12, 2004.

(51) Int. Cl.
*G05F 1/59* (2006.01)
(52) U.S. Cl. .................................... 323/271; 323/283
(58) Field of Classification Search ............... 323/225, 323/271, 282, 283
See application file for complete search history.

(56) References Cited

U.S. PATENT DOCUMENTS

| | | | | |
|---|---|---|---|---|
| 5,077,490 A | * | 12/1991 | Brown | 326/110 |
| 5,373,435 A | * | 12/1994 | Jayaraman et al. | 363/98 |
| 5,502,632 A | * | 3/1996 | Warmerdam et al. | 363/98 |
| 6,643,145 B1 | * | 11/2003 | Harrison | 363/16 |
| 6,815,936 B2 | * | 11/2004 | Wiktor et al. | 323/282 |
| 6,894,465 B2 | * | 5/2005 | Sutardja et al. | 323/268 |

* cited by examiner

*Primary Examiner*—Jeffrey Sterrett
(74) *Attorney, Agent, or Firm*—Gary R. Stanford

(57) ABSTRACT

A method of enabling and disabling diode emulation for a DC/DC converter which generates an output voltage including detecting a diode emulation request signal indicative of enabling or disabling diode emulation and delaying enabling or disabling diode emulation until after the output voltage begins changing. Diode emulation is enabled while the output voltage is decreasing or has reached a predetermined level and an optional delay may be included. Diode emulation is disabled while the voltage is increasing. A diode emulation control circuit includes a first circuit that determines when the output voltage is changing and a second circuit that selectively enables or disables diode emulation in response to a diode emulation enable/disable signal after the output voltage begins to change.

23 Claims, 2 Drawing Sheets

ENABLE AND DISABLE OF DIODE EMULATION IN A DC/DC CONVERTER

CROSS-REFERENCE TO RELATED APPLICATIONS

This application is based on U.S. Provisional Patent Application Ser. No. 60/552,551 filed on Mar. 12, 2004, and U.S. Provisional Patent Application Ser. No. 60/568,359 filed on May 5, 2004, which are both herein incorporated by reference for all intents and purposes.

BACKGROUND OF THE INVENTION

1. Field of the Invention

The present invention relates in general to power supply circuits and DC/DC converters, and is particularly directed to delaying enabling and disabling of diode-emulation in a DC/DC converter, including converters used to supply power to microprocessors, in such a manner as to prevent potential damage caused by output voltage bumps.

2. Description of the Related Art

When the load current of a DC/DC converter is very low, operating the converter in a mode called "diode emulation" leads to less power wasted by the converter. During diode emulation, the current in the power inductor is prevented from flowing in the reverse direction (that is, flowing from the output back to the input). When the converter is not performing diode emulation, the inductor current may flow in either direction. Thus, as diode emulation is enabled or disabled, the waveform of the current through the inductor changes. While the change is occurring, the inductor current may have a momentary change in its average current. For the brief moment that the average current is different, the DC/DC converter is not supplying the current demanded by the load. To compensate for the change in current from the inductor, the output capacitor supplies current, which causes the capacitor voltage to change. Since the capacitor voltage is also the output voltage of the converter, the output voltage changes. In particular, the output voltage of the DC/DC converter "bumps" up when diode emulation is enabled and bumps down when diode emulation is disabled.

The output voltage bumps generated when diode emulation is enabled or disabled may cause a malfunction of logic circuits being powered by the converter. One solution has been to simply disable diode emulation when providing power to circuitry that may be damaged by the voltage bumps, such as microprocessors or the like. Yet the disablement solution obviously eliminates the benefits associated with diode emulation including power savings, which is particularly advantageous for microprocessor circuits. It is desired, therefore, to enable and disable the diode emulation mode of operation while eliminating any potential damage to the logic circuits being powered by the DC/DC converter.

SUMMARY OF THE INVENTION

A method of enabling and disabling diode emulation according to an embodiment of the present invention for a DC/DC converter which generates an output voltage includes detecting a diode emulation request signal indicative of enabling or disabling diode emulation and delaying enabling or disabling diode emulation until after the output voltage begins changing. If the request is to enable diode emulation, the method may include detecting the output voltage decreasing and then enabling diode emulation. The method may further include enabling diode emulation after the output voltage has decreased by a predetermined amount, or after a delay after the output voltage begins decreasing, or after the output voltage has decreased by a predetermined amount and then after a predetermined delay. If the request is to disable diode emulation, the method may include disabling diode emulation while the output voltage is increasing, or after a predetermined delay after receiving the request. Delays may be determined by counting cycles of a PWM signal provided from the DC/DC converter.

A diode emulation control circuit according to an embodiment of the present invention for a DC/DC converter which provides an output voltage includes a first circuit that determines when the output voltage is changing, and a second circuit that selectively enables or disables diode emulation in response to a diode emulation enable/disable signal after the output voltage begins to change.

A DC/DC converter for a microprocessor according to an embodiment of the present invention includes a switching circuit and a control circuit. The microprocessor provides a VID signal indicative of a desired supply voltage and provides a diode emulation request signal coincident with the VID signal. The switching circuit switches an input voltage through an output inductor to provide a supply voltage for the microprocessor in accordance with a PWM signal and includes a diode emulation mode of operation. The control logic receives the VID and SLP signals, provides the PWM signal, and includes a diode emulation control circuit for selectively enabling or disabling the diode emulation mode of operation of the switching circuit after the supply voltage begins changing.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
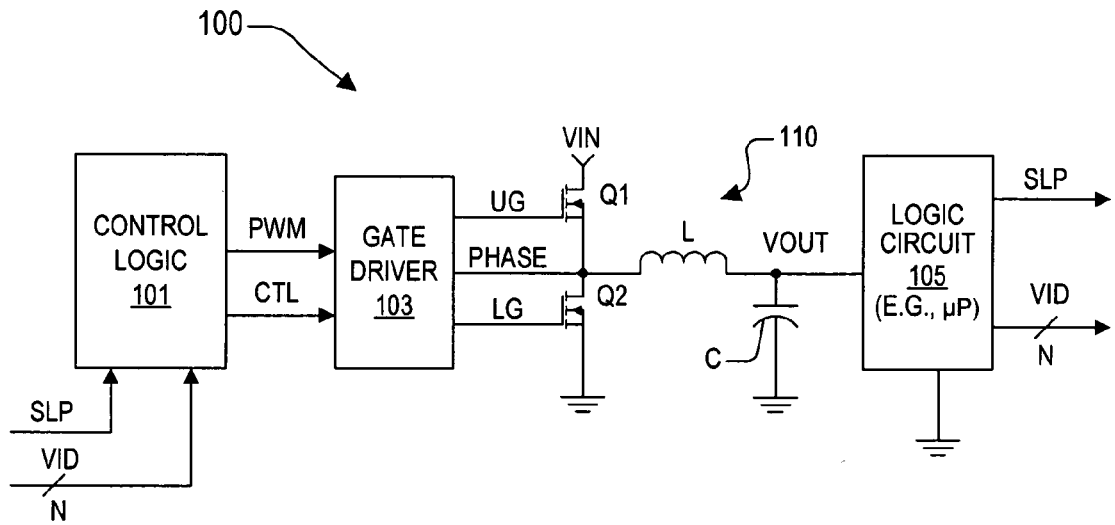
FIG. 1 is a simplified schematic and block diagram of a system including a buck-mode PWM DC-DC converter implemented according to an embodiment of the present invention.

FIG. 1 is a simplified schematic and block diagram of a system 100 including a buck-mode pulse width modulation (PWM) DC-DC converter 110 implemented according to an embodiment of the present invention. The converter 110 includes a PWM controller or control logic 101 which provides a signal PWM to a gate driver 103. The control logic 101 also asserts one or more control signals CTL to the gate driver 103 for controlling its mode of operation, such as enabling/disabling diode emulation as further described below. The gate driver 103 controls the turn-on and turn-off of a pair of electronic power switching devices or switches Q1 and Q2. In particular, the gate driver 103 generates an upper gate switching signal UG provided to the control terminal (e.g., gate) of the upper (or high side) switch Q1 and generates a lower gate switching signal LG provided to the control terminal of the lower (or low side) switch Q2. In the particular configuration shown, the switches Q1 and Q2 are depicted as N-channel metal-oxide semiconductor field-effect transistors (MOSFETs) having their drain-source current paths coupled in series between a pair of power supply rails (e.g., VIN and ground (GND)). Other types of electronic switching devices are contemplated.

The drain of switch Q1 is coupled to the VIN input voltage and its source is coupled to the drain of switch Q2 at a PHASE node. The source of Q2 is coupled to a power reference or common voltage level, such as GND. The PHASE node is coupled to one end of an output inductor L, having its other end coupled to one end of an output capacitor C forming an output node VOUT developing the output signal VOUT. The other end of the capacitor C is coupled to GND. As used herein, a node and the signal it develops are referred to with the same name unless otherwise indicated. The output node VOUT of the DC/DC converter 110 is coupled to provide power to a power input of a logic circuit 105 referenced to GND. Although only a single phase is shown, the present invention contemplates multiphase DC/DC converters. The logic circuit 105 is of any form or type that includes a low power mode in which it operates with a reduced voltage and in which it is desired to use diode emulation in conjunction with low input voltage. In one embodiment, for example, the logic circuit 105 is a microprocessor (µP) or the like.

The logic circuit 105 provides a voltage identification signal VID for controlling the voltage level VOUT. Although VOUT is the output of the DC/DC converter 110, it is the input voltage for the logic circuit 105. In the embodiment illustrated, VID is a digital signal with N bits in which "N" is a positive integer. The VID signal is received by the control logic 101, which controls the PWM signal accordingly to regulate VOUT to the requested voltage level as indicated by VIN. The logic circuit 105 also provides a digital sleep signal SLP to indicate a low power mode of operation. The SLP signal is received by the control logic 101, which enables or disables diode emulation accordingly. To enable or disable diode emulation, the control logic 101 asserts the CTL signal(s) to the gate driver 103, which changes operation of the switches Q1 and Q2 in accordance with the selected mode of operation. When diode emulation is enabled, for example, the gate driver 103 turns on the lower switch Q2 as usual but turns off the switch Q2 when the current through it changes direction. In one embodiment, the change of direction of current is detected by the PHASE node voltage going positive.

As previously described, when diode emulation was enabled or disabled for conventional DC/DC converters, the output voltage would bump up or down, respectively, potentially resulting in damage to the logic circuit 101. In many logic circuits, including the logic circuit 105, the request to enable diode emulation is coincident with a request to lower the output voltage. The control logic 101 delays the request to enable diode emulation until the output voltage VOUT is falling or after it has fallen to the lower voltage level. In this manner, the output voltage increase occurs in a manner that does not harm the logic circuit 105. The bump does occur but its effect is limited to slightly changing the rate of drop of the voltage level, so that it only lengthens the time needed to reach the lower voltage level. The slight delay in reaching the lower voltage level is not critical to operation of, and does not harm, the logic circuit 105. Similarly, the request to disable diode emulation is coincident with a request to raise the output voltage. The control logic 101 delays the request to disable diode emulation until the output voltage VOUT is rising. In this case, the current through the inductor L is not negative since it is supplying a significant amount of current to the output capacitor C to get to the higher voltage level. Thus, when diode emulation is disabled, the inductor current waveform does not have to change or otherwise is not significantly changed so that a bump in the output voltage VOUT is not produced.

Figure 2:
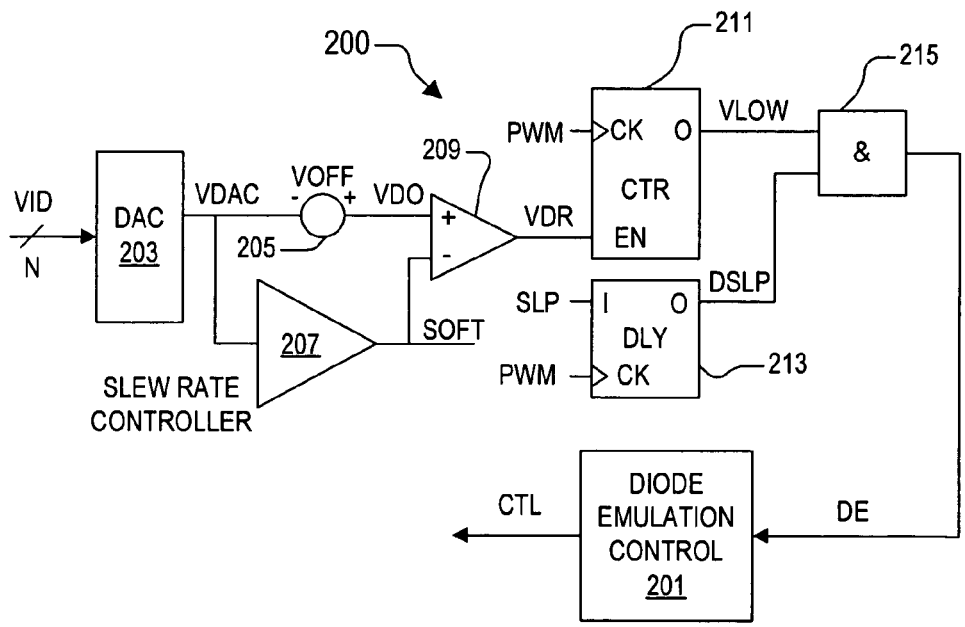
FIG. 2 is a simplified schematic and block diagram of DE control logic implementing a portion of the control logic of FIG. 1 according to an exemplary embodiment of the present invention for enabling and disabling diode emulation.

FIG. 2 is a simplified schematic and block diagram of DE control logic 200 implementing a portion of the control logic 101 according to an exemplary embodiment of the present invention for enabling and disabling diode emulation. The DE control logic 200 includes a diode emulation control block 201 implemented in a conventional manner. The diode emulation control block 201 receives a diode emulation signal DE and causes the control logic 101 to enable or disable diode emulation based on the level of the DE signal. In the embodiment shown, when the DE signal is asserted high (e.g., a high logic level), the diode emulation control block 201 enables diode emulation and when the DE signal is asserted low (e.g., a low logic level), then the diode emulation control block 201 disables diode emulation. The diode emulation control block 201 may assert the CTL signals as shown or otherwise indicates to other portions of the control logic 101 which asserts the CTL signals.

The digital VID signal is provided to the input of a digital to analog converter (DAC) 203, which outputs a corresponding analog signal VDAC indicative of the VID signals. In one embodiment, N=7 and the VID signal includes 7 bits or VID[6:0]. The analog VDAC signal is provided the negative terminal of a voltage source 205 and to the input of a slew rate controller 207. The positive terminal of the voltage source 205 is provided to the non-inverting (+) input of a comparator 209 and the output of the slew rate controller 207 is provided to the inverting (−) input of the comparator 209. The voltage source 205 has a fixed offset voltage VOFF so that the positive terminal of the voltage source 205 develops a voltage VDO=VDAC+VOFF. The output of the slew rate controller 207 provides a signal SOFT which ramps up or down in response to changes of VDAC at a controlled rate of change.

The output of the comparator 209 provides a voltage drop signal VDR indicative of the VOUT signal dropping (or reaching) a low voltage level. In the embodiment illustrated, the logic circuit 105 changes the VID signals in a relatively short period of time, such as within 50 nanoseconds (ns) or the like. The delay through the DAC 203 is relatively short, so that the VDAC signal changes quickly in response to changes of VID, such as within several hundred ns (e.g., 400 ns). The SOFT signal changes at a relatively slow and constant slew rate that is slower than the changes of VDAC. For example, VDAC may drop by about 300 millivolts (mV) in less than 1 microsecond (µs), whereas the slew rate controller 207 responds at a rate more like 3 mV per second so that the SOFT signal takes about 100 µs to drop by 300 mV. The SOFT signal is used to regulate the voltage of VOUT, so that VOUT follows SOFT. For clarity and simplicity of explanation, the VDAC, SOFT and VOUT signals vary within the same voltage levels (e.g., VDAC indicates the desired voltage level of VOUT, SOFT ramps to the new voltage level of VDAC, and VOUT follows SOFT). In the steady state, VDO is greater than SOFT by VOFF, so that VDR is high. When the VDAC signal drops to a lower voltage level, SOFT is still high so that VDR initially goes low. When the voltage of SOFT (and VOUT) falls to within VOFF of VDAC (or when it falls to VDO), VDR goes high again indicating that VOUT is within VOFF of its target low voltage level. In one embodiment, VOFF is a relatively small voltage level, such as approximately 10 mV.

The VDR signal is provided to the enable (EN) input of a counter (CTR) 211, which has a clock input (CK) receiving the PWM signal and an output (O) providing a low voltage signal VLOW. VLOW indicates that the SOFT signal (or VOUT) has reached a lower voltage level within VOFF of VDAC. When VDR is low, the counter 211 is disabled and asserts the VLOW signal low. When VDR goes high, the counter 211 is enabled and asserts the VLOW signal high after a predetermined number of cycles or clock pulses of the PWM signal (e.g., five or less PWM cycles).

The SLP signal is provided to an input (I) of a delay block 213, which has a clock input receiving the PWM signal and an output providing a delayed SLP signal DSLP. The delay block 213 is implemented as a counter or shift register or the like so that the DSLP signal is a delayed version of the SLP signal that is delayed by a predetermined number of cycles or pulses of the PWM signal (e.g., 2–3 PWM cycles). The VLOW and DSLP signals are provided to respective inputs of a two-input AND gate 215, having an output providing the DE signal. The DE signal is asserted high to enable the diode emulation mode when both VLOW and DSLP are high, but otherwise the DE signal is asserted low disabling diode emulation.

Figure 3:
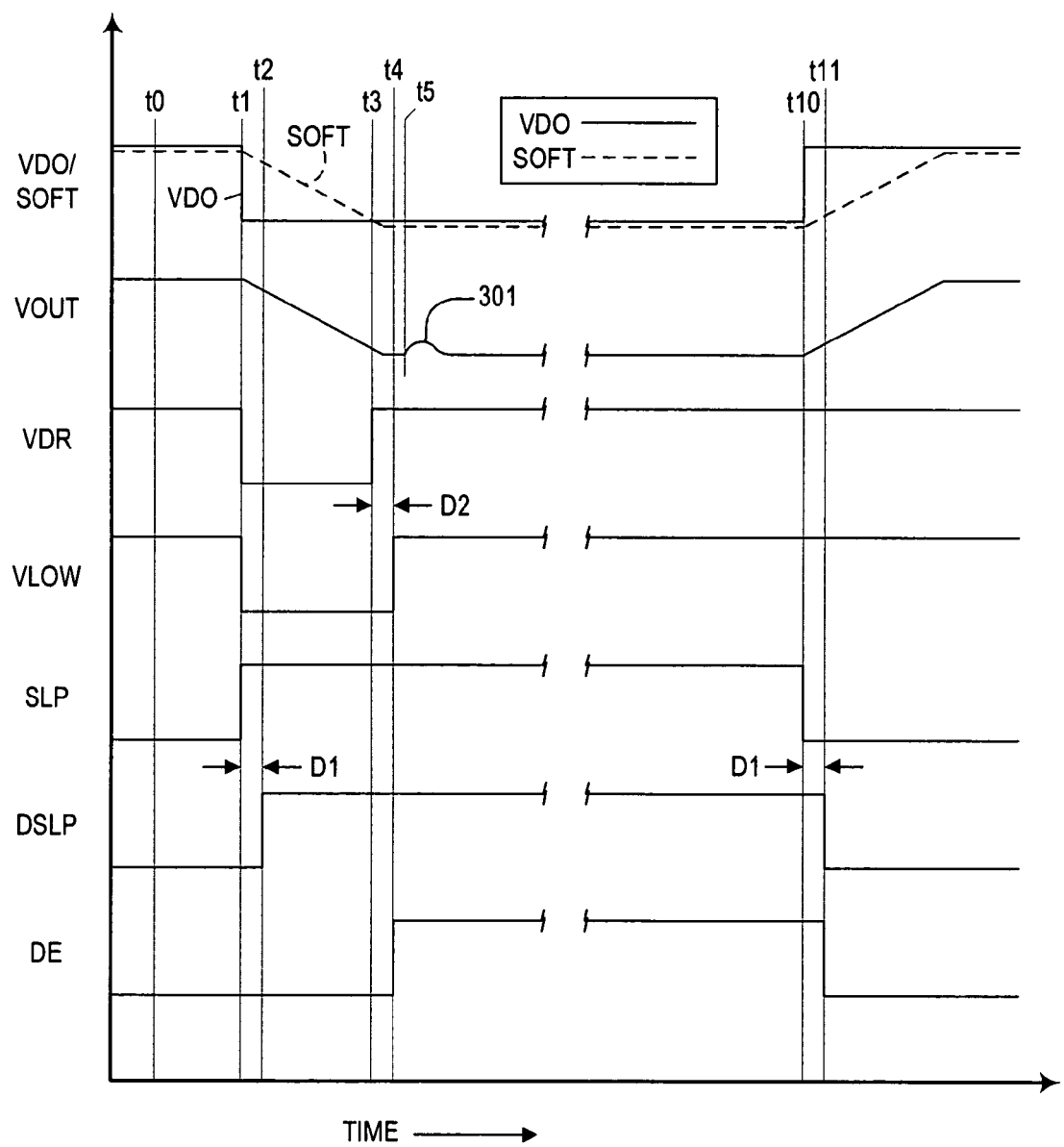
FIG. 3 is a timing diagram illustrating operation of the DE control logic of FIG. 2.

FIG. 3 is a timing diagram illustrating operation of the DE control logic 200. The VDO, SOFT, VOUT, VDR, VLOW, SLP, DSLP and DE signals are plotted on the Y-axis versus TIME along the X-axis. The units of the VDO, SOFT and VOUT signals are in Volts (V) and TIME is in seconds(s), although units are not shown in the timing diagram since the waveforms illustrate the general concepts as applied to any practicable scale. The VDO and SOFT signals are superimposed on top of each other to more clearly illustrated their relative voltage levels. The SOFT signal is shown with a dashed line to distinguish from VDO. The VDR, VLOW, SLP, DSLP and DE signals are logic signals in either a high or low state without units. At a first time t0, the VOUT signal is at a relatively high voltage level (e.g., 1.1 V) and the DE signal is asserted low so that the DC/DC converter 100 is not operating in the diode emulation mode. In steady state operation, the VDO signal is slightly above the SOFT signal so that the VDR signal is high enabling the counter 211, which initially asserts the VLOW signal high. The SLP and DSLP signals, however, are initially low so that DE is initially low to disable diode emulation.

At a subsequent time t1, the VDO, VLOW and SLP signals are shown asserted low at approximately the same time. The DE control logic 200 assumes that the logic circuit 105 changes the VID and SLP signals simultaneously or changes the VID signals first prior to asserting the SLP signal high. There is a delay from when the VID signals are changed to when the VDAC and VDO signals respond, such as on the order of about 500 ns, and a further delay through the comparator 209 and the counter 211 asserting the VLOW signal. The total delay is typically on the order of 1 μs or less. In this manner, the SLP signal is potentially asserted high before the VLOW signal goes low. The DSLP signal is asserted high at a time t2 after a delay D1 through the delay block 213 representing one or more cycles of the PWM signal. Each cycle of PWM is at least a few μs in duration, so that as long as the VID signals are asserted at about the same time as, or otherwise prior to, the SLP signal, the VLOW signal goes low before the DSLP signal goes high at time t2. In this manner, the DE signal stays low to time t2.

The SOFT signal begins ramping down at time t1 via operation of the slew rate controller 207, and the control logic 101 controls the PWM signal to reduce the VOUT signal to follow SOFT. Thus, VOUT ramps down generally following the SOFT signal. Eventually at a time t3, the SOFT signal falls to the level of the VDO signal and the comparator 209 asserts the VDR signal high. The VDR signal enables the counter 211, which counts a predetermined number of PWM cycles and then asserts the VLOW signal high at a time t4 after a delay D2. The delay D2 reflects the number of PWM cycles programmed into the counter 211, such as tens of microseconds in duration in an exemplary embodiment. Since the DSLP signal is also high at time t4, the DE signal is asserted high at about time t4 by the AND gate 215. The diode emulation control block 201 responds by enabling diode emulation, resulting in a slight bump or rise in the VOUT signal as shown at 301 just after time t4 at a time t5. The bump 301 in VOUT is relatively inconsequential and harmless to the logic circuit 105 since the voltage level of VOUT is already reduced by an appreciable amount. The bump 301 is only temporary so that the VOUT signal eventually settles to its target low voltage level indicated by the SOFT signal.

Later at a time t10, the logic circuit 105 changes the VID signals and asserts the SLP signal low to increase the voltage and to disable diode emulation. The VDO signal goes high and the SOFT and VOUT signals begin to ramp up. The VDR signal remains high since VDO remains above SOFT, so that VLOW remains asserted high. After the delay D1 through the delay block 213, the DSLP signal is asserted low at a time t11, so that the AND gate 215 asserts the DE signal low at about time t11. The diode emulation control block 201 responds by disabling diode emulation while the VOUT signal is already rising. Since VOUT is already rising when diode emulation is disabled, a bump or anomaly does not occur on VOUT since a significant amount of current is being driven to the output overwhelming any effect of diode emulation disablement.

Several variations of the DE control logic 200 are contemplated. As described above, the DE control logic 200 assumes that the logic circuit 105 changes the VID and SLP signals simultaneously or changes the VID signals first prior to asserting the SLP signal high to request diode emulation. If the SLP signal is asserted high requesting diode emulation while VOUT remains high or well before the VOUT signal ramps down, a positive bump occurs on the VOUT signal. Also, if the SLP signal is asserted low to disable diode emulation while VOUT remains low or well before the VOUT signal begins ramping up, a negative bump occurs on VOUT. Either case may potentially harm the logic circuit 105. The control logic 200 may be modified to ensure that the DE signal is not asserted high until VOUT is ramping down or otherwise has reached the lower voltage level, and/or that the DE signal is not asserted low until VOUT is rising. In one embodiment, for example, simple latching logic (not shown) or the like is provided to store the DE request and delay execution until VOUT exhibits the desired ramping characteristic or reaches is low voltage level. Furthermore, VOFF may be increased and/or the delay through the counter 211 reduced or eliminated to initiate enablement of diode emulation closer to or commensurate with the ramping down of the VOUT signal.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claim(s).

The invention claimed is:

1. A method of enabling and disabling diode emulation in a DC/DC converter which generates an output voltage, comprising:
   detecting a diode emulation request signal indicative of enabling or disabling diode emulation; and
   delaying enabling or disabling diode emulation until after the output voltage begins changing.

2. The method of claim 1, further comprising:
   said detecting a diode emulation request signal comprising detecting a request to enable diode emulation; and
   enabling diode emulation after the output voltage begins decreasing.

3. The method of claim 2, wherein said enabling diode emulation comprises enabling diode emulation after the output voltage decreases by a predetermined amount.

4. The method of claim 2, wherein said enabling diode emulation comprises enabling diode emulation after the output voltage begins decreasing and after a predetermined delay.

5. The method of claim 2, wherein said enabling diode emulation comprises enabling diode emulation after the output voltage decreases by a predetermined amount and after a predetermined delay.

6. The method of claim 5, wherein the predetermined delay is determined by counting cycles of a pulse width modulation (PWM) signal provided from the DC/DC converter.

7. The method of claim 1, further comprising:
   said detecting a diode emulation request signal comprising detecting a request to disable diode emulation; and
   disabling diode emulation while the output voltage is increasing.

8. The method of claim 1, further comprising:
   said detecting a diode emulation request signal comprising detecting a request to disable diode emulation; and
   disabling diode emulation after a predetermined delay.

9. The method of claim 8, wherein the predetermined delay is determined by counting cycles of a pulse width modulation (PWM) signal provided from the DC/DC converter.

10. A diode emulation control circuit for a DC/DC converter which provides an output voltage, comprising:
    a first circuit that determines when the output voltage is changing; and
    a second circuit, coupled to said first circuit, that selectively enables or disables diode emulation in response to a diode emulation enable/disable signal after the output voltage begins to change.

11. The diode emulation control circuit of claim 10, wherein said first circuit comprises a comparator that determines when the output voltage has dropped by a predetermined amount.

12. The diode emulation control circuit of claim 11, wherein said second circuit comprises a logic gate that enables diode emulation after the output voltage has dropped by said predetermined amount.

13. The diode emulation control circuit of claim 11, wherein said first circuit further comprises:
    a converter that converts a voltage identification signal to a voltage level signal indicative of a new voltage level;
    a slew rate controller that inputs said voltage level signal and that outputs a soft voltage signal that ramps from a current voltage level to said new voltage level; and
    an offset voltage device, coupled to said converter, that outputs a voltage level offset signal;
    wherein said comparator compares said voltage level offset signal with said soft voltage signal.

14. The diode emulation control circuit of claim 13, wherein said first circuit further comprises a first delay circuit, coupled to an output of said comparator, that outputs a low voltage signal after the output voltage has dropped by said predetermined amount and after a predetermined delay.

15. The diode emulation control circuit of claim 14, wherein said first delay circuit delays a predetermined number of cycles of a pulse width modulation (PWM) signal generated by the DC/DC converter.

16. The diode emulation control circuit of claim 14, wherein said second circuit comprises:
    a second delay circuit that receives said diode emulation enable/disable signal and that outputs a delayed diode emulation enable/disable signal; and
    gate logic that enables diode emulation when said low voltage signal and said delayed diode emulation enable/disable signal are provided.

17. The diode emulation control circuit of claim 16, wherein said second delay circuit delays a predetermined number of cycles of a pulse width modulation (PWM) signal generated by the DC/DC converter.

18. The diode emulation control circuit of claim 10, wherein said second circuit comprises a delay circuit that disables diode emulation in response to said diode emulation enable/disable signal after a predetermined delay.

19. A DC/DC converter for a microprocessor, the microprocessor providing a voltage identification signal indicative of a desired supply voltage and providing a diode emulation request signal coincident with said voltage identification signal, said DC/DC converter comprising:
    a switching circuit that switches an input voltage through an output inductor to provide a supply voltage for the microprocessor in accordance with a pulse width modulation (PWM) signal, said switching circuit having a diode emulation mode of operation; and
    control logic, coupled to said switching circuit, that receives the voltage identification and signals, that provides said PWM signal, and that includes a diode emulation control circuit for selectively enabling or disabling said diode emulation mode of operation of said switching circuit after said supply voltage begins changing.

20. The DC/DC converter of claim 19, wherein said diode emulation control circuit comprises:
    a comparator circuit that determines when said supply voltage decreases by a predetermined amount; and
    an enable/disable circuit, coupled to said comparator circuit and responsive to said diode emulation request signal, that enables diode emulation after said supply voltage decreases by said predetermined amount and that disables diode emulation after a first predetermined delay after said supply voltage begins to increase.

21. The DC/DC converter of claim 20 wherein said comparator circuit comprises:
  a digital to analog converter (DAC) that converts said voltage identification signal to an analog voltage signal;
  a slew rate controller that generates a soft control signal based on said analog voltage signal; and
  a comparator that determines when said soft control signal decreases to within a predetermined voltage offset of said analog voltage signal.

22. The DC/DC converter of claim 20, further comprising a delay circuit coupled to said comparator circuit that adds a second predetermined delay after said supply voltage decreases by said predetermined amount before enable diode emulation.

23. The DC/DC converter of claim 20, wherein said enable/disable circuit comprises:
  a delay circuit that delays said diode emulation request signal by said first predetermined delay and that provides a delayed diode emulation request signal; and
  gate logic responsive to said comparator circuit and said delayed diode emulation request signal.

* * * * *